(12) United States Patent
Balasaygun

(10) Patent No.: US 9,094,889 B2
(45) Date of Patent: Jul. 28, 2015

(54) METHOD AND SYSTEM TO MANAGE MOBILE DATA NETWORK USAGE FOR VOIP CALLS

(71) Applicant: Avaya Inc., Basking Ridge, NJ (US)

(72) Inventor: Mehmet C. Balasaygun, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/084,186

(22) Filed: Nov. 19, 2013

(65) Prior Publication Data

US 2015/0140981 A1    May 21, 2015

(51) Int. Cl.
*H04M 11/00*      (2006.01)
*H04W 48/02*      (2009.01)
*H04W 4/26*       (2009.01)
*H04W 4/24*       (2009.01)

(52) U.S. Cl.
CPC .............. *H04W 48/02* (2013.01); *H04W 4/24* (2013.01); *H04W 4/26* (2013.01); *H04M 2215/32* (2013.01)

(58) Field of Classification Search
CPC ............... H04M 2215/32; H04M 2215/0188; H04M 2215/0108; H04M 2215/0184; H04M 15/80; H04M 15/44; H04M 15/84; H04M 15/8011; H04W 4/24; H04W 4/26
USPC ........... 455/407, 406, 405, 414.1, 507, 550.1, 455/418
See application file for complete search history.

(56) References Cited

U.S. PATENT DOCUMENTS

2009/0068984 A1*  3/2009  Burnett ................. 455/408
2012/0059748 A1*  3/2012  Matsuo et al. .......... 705/34
2012/0157038 A1*  6/2012  Menezes et al. ........ 455/405

* cited by examiner

*Primary Examiner* — Khai M Nguyen
(74) *Attorney, Agent, or Firm* — Maldjian Law Group LLC; John Maldjian; William J. Connelly, III

(57) ABSTRACT

A method and system to select an operating mode of a mobile device, the method including: detecting a request for a call; determining by a processor of the mobile device a data usage limit; determining by a processor of the mobile device a cumulative amount of data sent using the data connection during a current billing period; determining, by a processor of the mobile device, an availability of a data connection; and setting a communication mode of the mobile device depending upon the availability of a data connection and a comparison of the cumulative amount of data sent to the data usage limit.

18 Claims, 10 Drawing Sheets

500

600

700

800

900

METHOD AND SYSTEM TO MANAGE MOBILE DATA NETWORK USAGE FOR VOIP CALLS

BACKGROUND

1. Field of the Invention

Embodiments of the present invention generally relate to multimodal mobile phones, and particularly to automatically selecting an operating mode of the mobile phone to lower the cost of a data plan usage used by the mobile phone.

2. Description of Related Art

A softphone is a software program for making voice or video telephone calls over the Internet using a general purpose computer, rather than using dedicated hardware. Such a software program may be referred to as a softclient. Often, a softphone is designed to behave like a traditional telephone, sometimes appearing as an image of a phone, with a display panel and buttons with which the user can interact. Often, a softphone runs on a mobile platform handling telephone calls through the IP network provided by the Wi-Fi or the cellular data network such as a 3G/4G/4GLTE data link, and so forth.

Calls transported over a traditional cellular telephone network may be subject to usage limits or pricing plans that are different from usage limits or pricing plans of a data communication connection. For example, a voice call transported as a traditional cellular call may be subject to a limit on a monthly amount of minutes used, but may not have a separate limit on data usage. On the other hand, a communication session transported by a data communication connection may have an overall limit on the quantity of data (e.g., a limit on the number of gigabytes per month), but no specific limit on the number of minutes used.

A softphone may be configured to transport voice calls or video telephone calls by default over a data communication connection. However, if a user makes many such calls or exceptionally long calls, the user may exceed their usage limit for a data communication connection, or may enter a more expensive pricing regime, even though the user's usage limit using the traditional cellular telephone network has not been exceeded or may be in a lower pricing regime. Such imbalanced usage incurs extra cost for a user.

Some cellular service providers may provide alerts if a user's plan use is high and/or close to the monthly allowance. By the time a user receives such a notice, it may be too late to make all remaining calls for the billing period as regular cell phone calls. Or, the user may need to pay for certain calls over a data communication connection if it uses features that are unavailable as ordinary cell phone calls.

Accordingly, systems and a method are needed in order to overcome existing challenges and to reduce the cost of mobile phone usage. A softphone running on a mobile phone, providing VoIP and video/IP services should be able to select from among available operating modes in order to reduce costs.

SUMMARY

Embodiments in accordance with the present disclosure provide a method and system to select an operating mode of a mobile device, the method including: detecting a request for a call; determining by a processor of the mobile device a data usage limit; determining by a processor of the mobile device a cumulative amount of data sent using the data connection during a current billing period; determining, by a processor of the mobile device, an availability of a data connection; and setting a communication mode of the mobile device depending upon the availability of a data connection and a comparison of the cumulative amount of data sent to the data usage limit.

A method in accordance with an embodiment of the present disclosure may further establishing a first call leg between the mobile device and a system controller, wherein the first call leg is by use of the set communication mode; establishing a second call leg between the system controller and a far-end terminal; and joining, by the system controller, the first call leg and the second call leg to produce the call.

A method in accordance with an embodiment of the present disclosure may further include during an ongoing call, determining by the processor of the mobile device a cumulative amount of data sent using the data connection during the current billing period; determining, by a processor of the mobile device, an availability of the data connection; and changing the communication mode of the ongoing call depending upon the availability of the data connection and a present comparison of the cumulative amount of data sent to the data usage limit.

A system in accordance with an embodiment of the present disclosure may include: an interface configured to detect a request for a call; a processor of the mobile device configured: to detect a data usage limit; to determine a cumulative amount of data sent using the data connection during a current billing period; to determine an availability of a data connection; and to set a communication mode of the mobile device depending upon the availability of the data connection and a comparison of the cumulative amount of data sent to the data usage limit.

These and other advantages will be apparent from the disclosure of the present invention(s) contained herein.

The preceding is a simplified summary of the present invention to provide an understanding of some aspects of the present invention. This summary is neither an extensive nor an exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
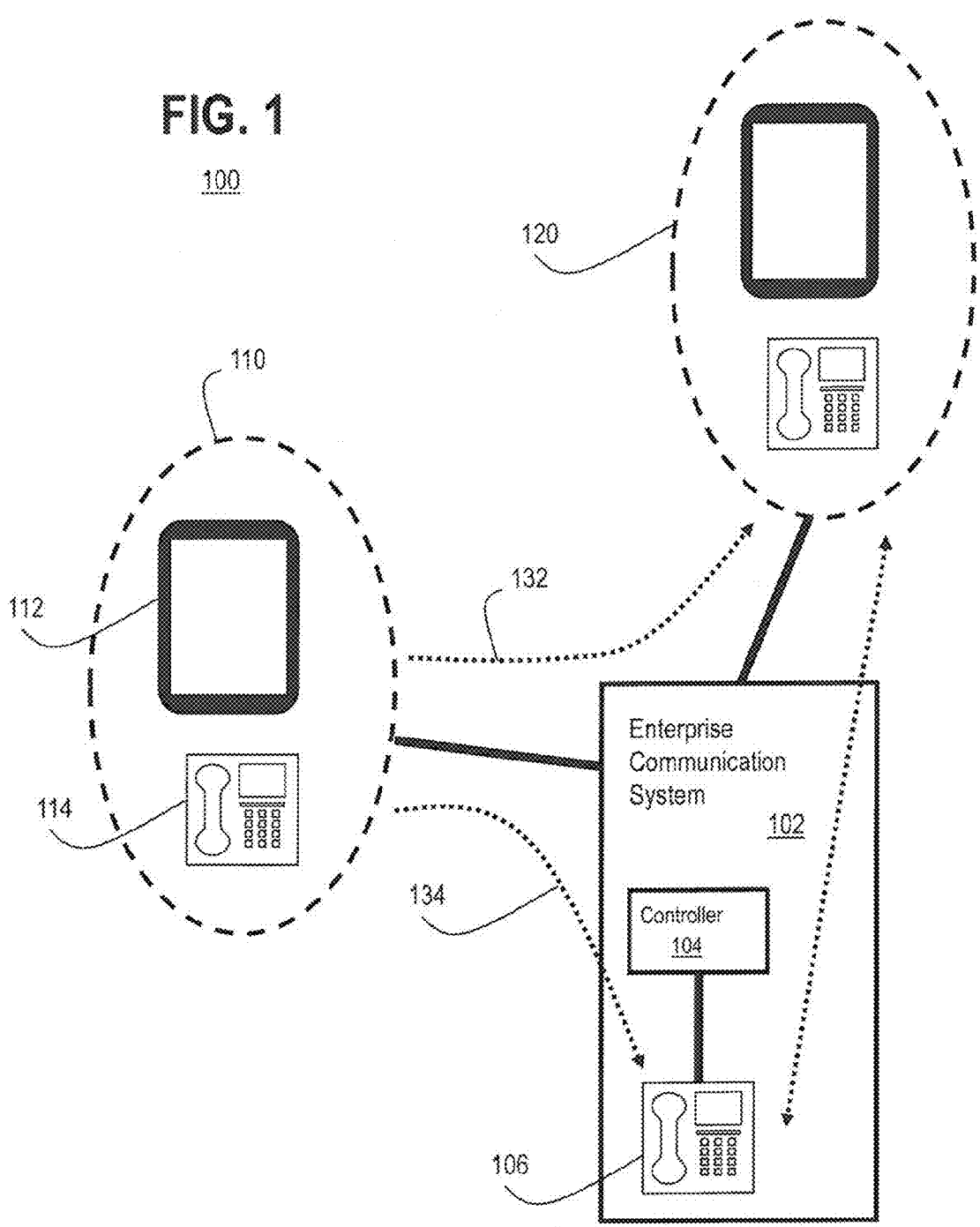
FIG. 1 illustrates a model of a conventional telecommuter interaction.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The present invention will be illustrated below in conjunction with an exemplary communication system. Although well suited for use with, e.g., a system having an ACD or other similar contact processing switch, the present invention is not limited to any particular type of communication system switch or configuration of system elements. Those skilled in the art will recognize that the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered user datagram protocol ("UDP") port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

In embodiments described herein, callback mode (i.e., telecommuter mode) refers to an ability of a softphone to set up a conventional cellular telephone call that terminates at a mobile phone's cellular number, such that a voice media path is not carried through the data network, in order to minimize bandwidth usage by the mobile phone on the data network.

Callback mode allows de-coupling of media path from the signaling path. For example, callback mode allows an endpoint involved in call control signaling (e.g., SIP or H.323 signaling) to choose a media path that is terminated at an another endpoint. Callback mode allows an endpoint that has limited bandwidth to an enterprise communication system to use an alternative voice path that does not make use of the limited bandwidth.

Callback mode may be useful for, e.g., telecommuting workers who are based on remote locations from the corporate network. Such a telecommuting worker typically will terminate the voice path at his/her (PSTN) home telephone number. In another scenario, a remote branch site with limited VPN bandwidth, which terminates its voice path at local public switched telephone numbers (PSTN), may find callback mode useful.

The term "controller endpoint" as used herein refers to an endpoint that controls two different call legs, one call leg terminated at the callee number (e.g., an audio termination endpoint), the other call leg terminated at the caller number (e.g., a far-end party). The controller endpoint will set up a media path (e.g., voice media path for a voice call, video media path for a video call, etc.) between the caller and callee.

For example, in a SIP or H.323 telecommuter call, a controller endpoint may choose to use a different audio termination number dynamically based on the type of call that the user initiates.

The term "audio termination number" as used herein refers to a telephone number at which the controller endpoint chooses to terminate the media path. This number may be another enterprise extension serviced by SIP or H.323 protocol, a PSTN or mobile number to which the controller endpoint may set up calls, and so forth.

FIG. 1 illustrates model 100 of a conventional telecommuter interaction. Model 100 includes an enterprise communication system 102, a controller endpoint 110 and a far-end party 120. Enterprise communication system 102 may further include a controller 104 and an audio termination endpoint 106 that is internal to the enterprise communication system 102. Controller endpoint 110 may include communication devices such as a tablet or smartphone 112, non-mobile telephone 114, and so forth. The far-end party 120 may include other communication devices, similar to that of controller endpoint 110.

Model 100 further depicts steps used to set up a call between a far-end party 120 and audio termination point 106. Controller 110 accomplishes this by setting up a call leg 132 between controller endpoint 110 and far-end party 120. Controller 110 further sets up another call leg 134 between controller endpoint 110 and audio termination point 106. Call legs 132, 134 may be set up in either order. After the call legs 132, 134 are set up, then enterprise communication system 102 joins the call legs together, thus forming a call between audio termination endpoint 106 and far-end party 120.

Figure 2:
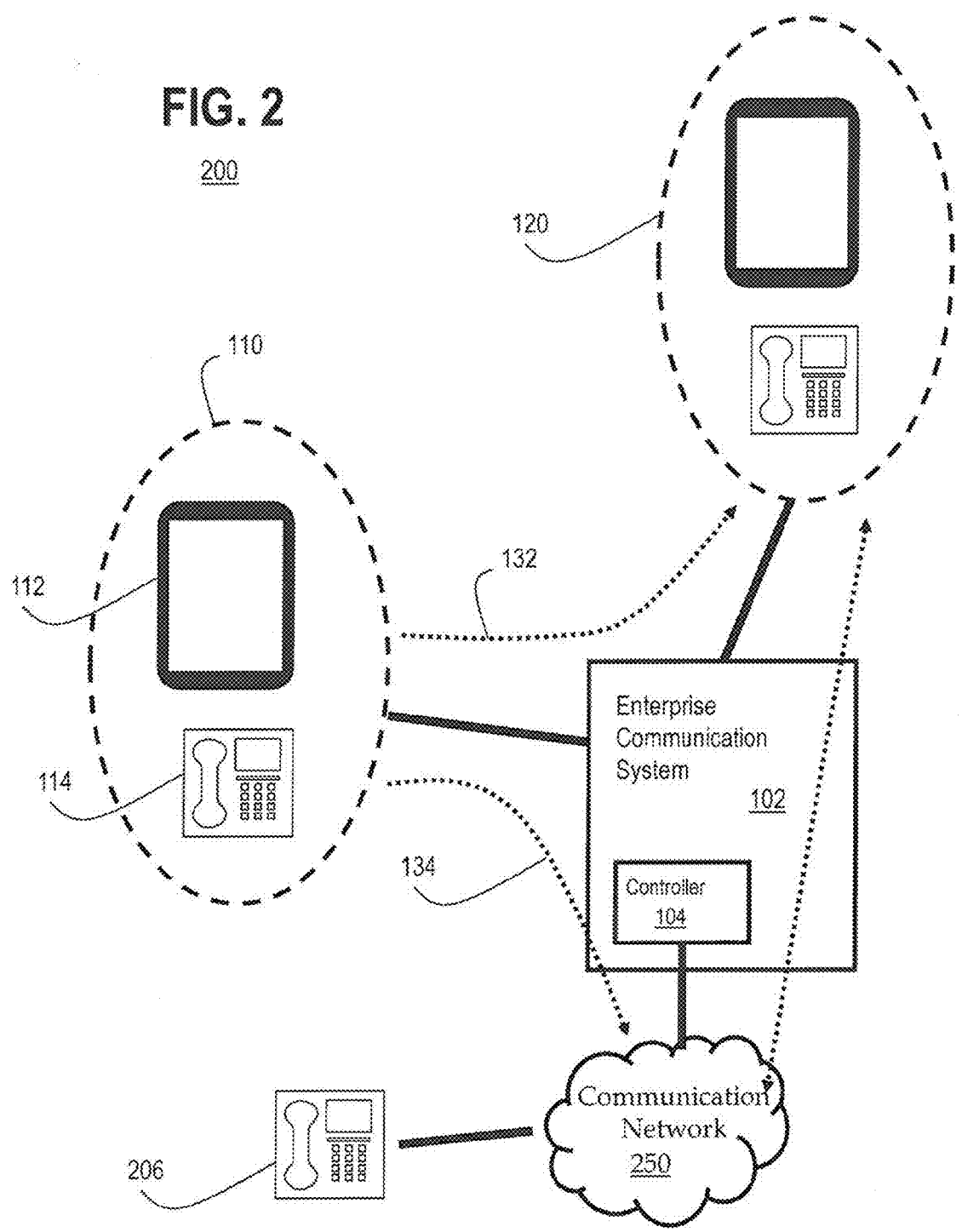
FIG. 2 illustrates another model of a conventional telecommuter interaction.

FIG. 2 illustrates model 200 of a conventional telecommuter interaction. Model 200 is similar in many respects to model 100. However, one difference is that audio termination endpoint 106 is no longer internal to the enterprise communication system 102, but rather is communicatively coupled to enterprise communication system 102 by a communication network 250 such as the Internet. Operation of model 200 is otherwise substantially the same as operation of model 100.

Figure 3:
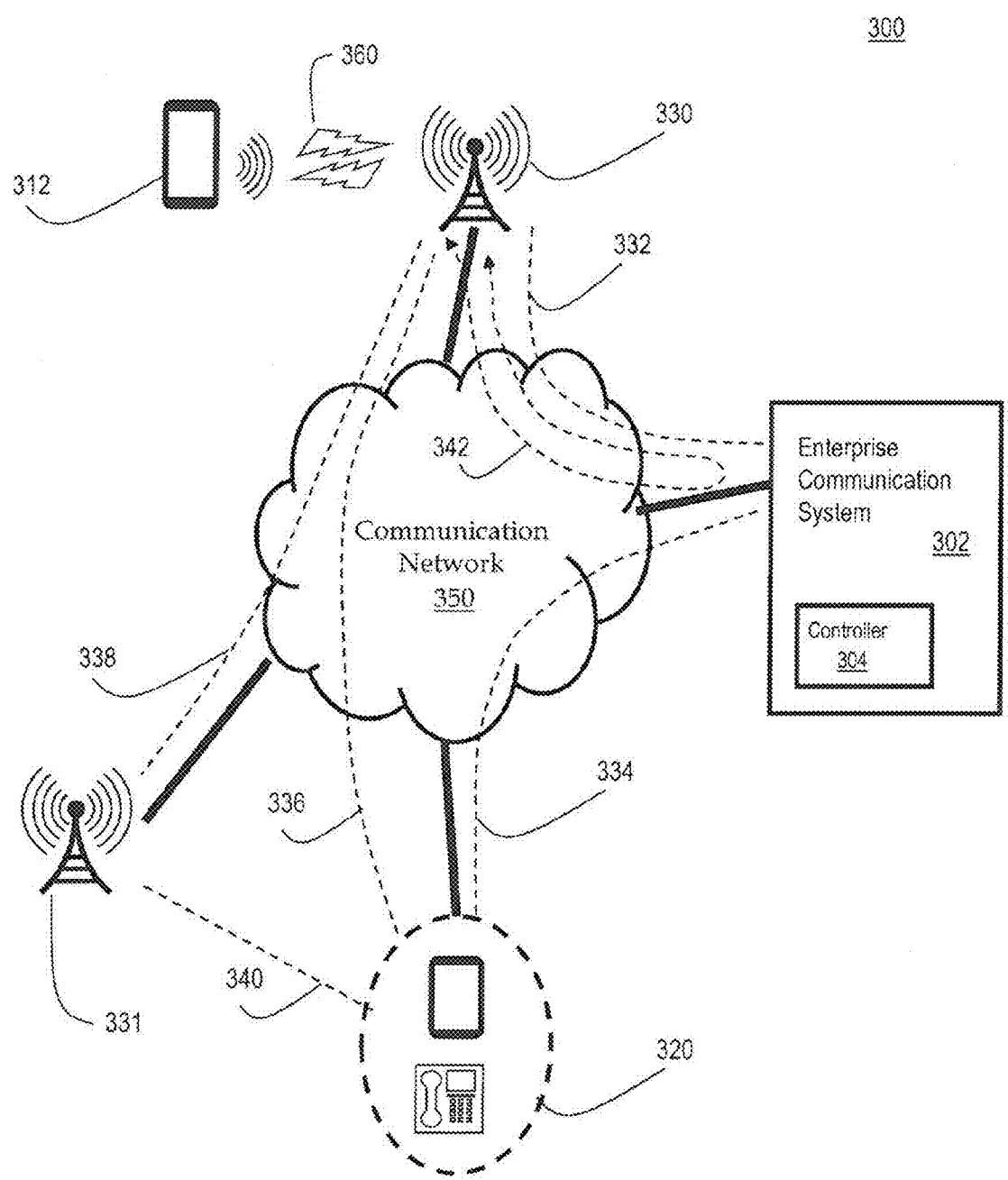
FIG. 3 illustrates a model of a telecommuter interaction in accordance with an embodiment of the present disclosure.

FIG. 3 illustrates model 300 of a telecommuter interaction in accordance with an embodiment of the present disclosure. Model 300 includes an enterprise communication system 302, a mobile communication device 312 and a far-end party 320. Enterprise communication system 302 may further include a controller 304. Far-end party 320 may include communication devices such as a tablet or smartphone 112, non-mobile telephone 114, and so forth.

Mobile communication device 312 is capable of wireless communication 360 with base station 330, for example, by cell phone signals and/or Wi-Fi signals. Mobile communication device 312 may further include a softclient (e.g., a VoIP client) in order to perform as a controller endpoint, and/or a cell phone application program in order to perform as an audio termination point. Base station 331 is similar to base station 330, but may be located within range of far-end party 320 in order to support wireless communication by cell phone signals and/or Wi-Fi signals.

If far-end party 320 does not support wireless communication (e.g., a wired phone or a mobile phone that does not receive a sufficiently strong signal), then a conventional cell phone transported by the cellular voice network may take path 338 from base station 330 through communication network 350 to base station 331, and then path 340 from base station 331 to far-end party 320.

Model 300 further depicts steps used to set up a VoIP call between mobile communication device 312 and far-end party 320. Mobile communication device 312 accomplishes this by setting up a call leg 342 from mobile communication device 312, through enterprise communication system 302, and back to mobile communication device 312. Mobile communication device 312 further sets up another call leg 332/334 between mobile communication device 312 and far-end party 320. Call legs 332, 334 and 342 may be set up in any order. After the call legs 332, 334 and 342 are set up, then enterprise communication system 302 joins the call legs together, thus forming a VoIP call between mobile communication device 312 and far-end party 120.

Note that a softclient running on mobile communication device 312 selectively uses either VoIP or the mobile device's cell phone number as the audio termination endpoint, depending on the number of bytes remaining on the data plan. When the softclient in mobile communication device 312 uses an audio termination point (i.e., non-VoIP mode), it uses much less bandwidth on the data plan because the voice path is not set up through the data network. Instead, it is set up through the cellular voice network.

Embodiments in accordance with the present disclosure control making a decision on how to handle incoming and outgoing calls based on data plan usage information. Embodiments are able to answer an incoming call over SIP, and terminate a voice path of the call at the cellular part of the mobile phone, by establishing a separate call leg through the SIP enterprise network to the cellular phone number of the mobile phone. Embodiments include a softclient application that is capable of providing both VoIP service as well as a callback mode of communication.

Embodiments in accordance with the present disclosure tend to minimize data plan consumption based on predetermined criteria. The goal is to lower an end-user's data communication charges by changing a communication mode of the softclient from VoIP mode to a mode where the voice media path is terminated on the mobile phone's cell phone number (or vice versa), based on the availability or unavailability of free, pre-paid or flat-rate data plan bandwidth. Such bandwidth may be considered to be bandwidth for which the marginal cost of using the next X Mbytes is zero.

A call using SIP methods and another call using callback mode methods both allow a softclient to control a voice path, and allow a call to be terminated at a user-specified destination (e.g., a public-switched telephone number (PSTN)). However, SIP methods and callback mode methods differ in several respects. For example, for a call using callback mode methods, a call manager controls signaling so that a media path is set up at the callee callback number (e.g., PSTN number). Typically, a softclient running in callback mode, e.g., acting as a callback controller, uses a PSTN number for the callback number. The mode of configuration typically does not change while the softclient is connected and registered with the enterprise telephony network. In contrast, for a call using SIP methods, a SIP endpoint (i.e., a softclient) acts as a controller to ensure that a media path is set up at the callee callback number.

If not for limits on data plan usage, or increased cost for using the data plan, VoIP mode may be preferred over callback mode because of factors such as the availability of higher-quality codecs than in callback mode, and/or additional call setup features available through a protocol such as SIP, and so forth.

A benefit of using callback mode methods is to provide a good quality media connection when the VoIP link is unable to provide a reliable communication link of sufficiently high quality. When compared with VoIP mode, a softclient operating in callback mode uses much less network data bandwidth than when operating in VoIP mode. This is because in callback mode, the softclient uses data bandwidth substantially only for exchanging SIP messages with the telephony infrastructure, regarding call (e.g., call setup/teardown) and feature management (e.g., hold, resume, advanced SIP telephony (AST) feature invocation, etc.).

Embodiments in accordance with the present disclosure provide a method, using a softclient running on a mobile phone in callback mode, to use the cellular number of the mobile phone as a callback number. When either an incoming or outgoing call is established, a softclient acting as a controller creates two call legs through the enterprise telephony network.

The enterprise network may be, for example, a telecommunication network deployed by a large employer, other customer-premise equipment, central equipment such as a central office exchange (centrex), and/or cloud based solution. The enterprise network may include a network controller to manage communication features and services offered to members of the enterprise.

The enterprise network may include a company customer premise equipment (CPE) telephony network, e.g., a PBX system that may be deployed in an enterprise to route call messages. An enterprise communication system and controller may be on-premises or off-premises. An on-premise communication system and controller may be deployed within a corporate Intranet. The on-premise communication system and controller would include interfaces to PSTN or IP networks in order to interface with an external communication systems. An off-premise communication system and controller may be hosted in the cloud as a managed communication service provided by a service provider. For example, a network operator (e.g., Cablevision™) or a cloud service provider (e.g., Skype™) may offer telecommunication services to small businesses. A customer of the network operator or cloud service provider (e.g., a corporate customer with employees) purchases communication service, but does not own the enterprise communication equipment. However, employees of the small business would receive access to services provided by the telecommunication equipment hosted outside of a corporate Intranet.

In callback mode, the softphone initiates one call leg towards its mobile phone number, and another call towards the called party. Both call setup requests arrive at the enterprise's SIP or H.323 network and an enterprise call manager does the routing. If the called party is a PSTN number, the softphone sends a call setup request to the enterprise telephony network for the enterprise communication system to route call set up request over to PSTN/cellular network to ring the user's mobile phone number. Once this call leg is set up, the softphone then sends a second call setup request to the called party, and the enterprise communication system sets up this second call to the called party either through IP network or PSTN, depending on the routing rules of the enterprise system and the address of the called party.

Thus, in callback mode, the softphone sets up two call legs. Of these two call legs, the call leg to the mobile phone will appear as an incoming call from mobile phone app's point of view.

In VoIP mode, the softphone sets up only a single call leg, which is to the called party, because there no need for a second call leg to carry voice packets over a cellular network to the mobile phone.

The first call leg is to the cellular number of the mobile phone that is also hosting the softclient. The second call leg is to the called party. The softclient application on the mobile phone is then responsible for making sure that SIP SDP media negotiation includes the capabilities of the cellular connection of the mobile phone and the capabilities of the called party. The softclient acts as a SIP signaling mediator in establishing a media stream between the cellular number and the called party.

If the user of the embodiment is the callee, and is receiving a call, the callee does not have to accept the calling mode that the caller selected. The callee may use a different mode. How a callee answers a call is independent of whether the caller is using VoIP or callback mode. For example, the caller may have started a VoIP call, but when a call alert arrives at the callee's softphone, the softphone may set up a new call leg to the mobile phone number so that the enterprise communication system deliver voice packets (e.g., a media stream) through the cellular voice network and not over the data network.

Embodiments in accordance with the present disclosure use the softclient to make automatic decisions regarding whether to use VoIP mode or callback mode, based on data plan usage criteria provided to the softclient. Examples of data plan usage criteria options may include:

a) A monthly data plan allowance limit provided by the cellular provider. For example, the cellular provider may include the first 500 Mbytes of data transfer with the monthly charge, and may charge an additional fee for every 100 Mbytes beyond this limit used during each billing cycle. This embodiment would typically involve the softclient query the data plan limit and the current usage level under program control. When the monthly usage information reaches a predetermined percentage of the maximum usage that the data plan provides without a surcharge, the softclient may switch to using callback mode rather than VoIP mode. This option assumes that the mobile phone provides and makes available application programming interfaces (APIs) that the softclient can use to query usage and plan limit information. Optionally, some embodiments may receive and interpret alert messages from the cellular provider that alert the user regarding data plan usage. The alert message is then used by the softclient application to control the operating mode of calls.

In some embodiments, an in-progress call may be affected. For example, an in-progress VoIP call may be converted into a callback call if an allowance limit is exceeded during the call. Such a capability may be configurable, e.g., through an end user policy.

b) A data usage limit set by the end user at the softclient application. For example, a user who knows that their monthly allowance is a fixed amount (e.g., 500 Mbytes), may set their data use limit to be a fixed amount below the monthly allowance (e.g., the data use limit may be set to be 100 Mbytes below the monthly allowance). In some embodiments, the user-set data use limit may be set to be a fixed percentage of the monthly allowance (e.g., 85%). Criterion (b) may involve a softclient tracking its usage of the data network, and provide reports on demand or in real time to the end user. The end user can then use this information to set a limit on the softclient. The softclient can use the limit to trigger action, upon reaching of this limit, to switch from VoIP mode of operation to callback operation. Criterion (b) is discussed below in further detail.

c) Information regarding the monthly cellular data plan billing cycle may be provisioned on the softclient. In this embodiment, a softclient provisioned with the monthly billing cycle may automatically revert to VoIP mode at the beginning of each billing cycle. Then, at a predetermined point later in the billing cycle, when it would be predicted that the data plan bandwidth is at or near a limit, the softclient would switch to callback operation to minimize data plan use for the remainder of the billing cycle. This monthly billing cycle information may be used together with criterion (b) so that when a new monthly billing cycle starts, the softclient automatically resets its usage information and reverts to using VoIP mode.

d) Identity of a data network that the softclient application is connected to. Optionally, the softclient may store a default association of a data network and a preferred operating mode for the data network. The data network may be identified by an ID, name of a mobile data network, etc. For example, Wi-Fi networks may be deemed by default to be free as long as the softclient is able to log into the Wi-Fi network. In this embodiment, when the mobile phone detects that it is connected to a predetermined mobile data network, the mobile phone will automatically use the preferred operating mode for that network (e.g., either VoIP mode or callback mode). A drawback of such embodiments is that the mobile data network may be unable to provide higher fidelity audio quality via VoIP.

In either VoIP or callback mode, criterion (d) may be used by the softphone depending on the network identification. If the softphone can access an LTE cellular network, in which it is possible to provide high fidelity VoIP codec over the LTE cellular network, some embodiments may not provide VoIP service but instead will use callback in order to deliver voice packets over the LTE cellular network.

Criteria are not limited to the examples of criteria (a)-(d), and may include other criteria.

In other examples of criterion (d), embodiments may detect a network ID that the softclient is able to receive, and may be pre-provisioned with cost characteristics of the detected network. The embodiments may determine from the pre-provisioned data whether the mobile phone is in a roaming region of the detected network (higher cost) or a home region of the detected network (lower cost). In such a scenario, the softclient may prefer the detected network if the mobile phone is in the home network, and/or may avoid the detected network if the mobile phone is in a roaming region. In another example, embodiments may determine whether the detected network is a free Wi-Fi network, and if so then the mobile phone will use the detected network for data transfers.

With respect to criterion (b), in some embodiments the user-set data use limit may be pro-rated to shorter periods of time. For example, a user may set a weekly data use limit to be one-fourth of the monthly allowance, or may set a daily data use limit to be one-thirtieth of the monthly allowance.

In some embodiments, the user-set data use limit may be set to be a time-dependent percentage of the monthly allowance. For example, if 30% of a monthly billing cycle has passed, the user-set data use limit may be 30% of the monthly allowance. The user-set data use limit percentage may be expressed as an equation that is a function of the point in the monthly billing cycle. For example, if the billing cycle is normalized to the time interval t=[0, 1], then the user-set data use limit $y(t)$ at normalized time "t" may be expressed as a straight limit such as shown below in Equation (1).

$$y(t) = (\text{monthly allowance}) * t \quad (1)$$

In some embodiments, the percentage may be a sliding percentage, such that greater than a straight percentage may be used toward the beginning of a billing cycle but will converge at the end of the billing cycle to be at or below the monthly allowance. For example, if the billing cycle is normalized to the time interval t=[0, 1], then the user-set data use limit $y(t)$ at normalized time "t" may be expressed as a limit such as shown below in Equation (2).

$$y(t) = (\text{monthly allowance}) * (0.5 + 0.5 * t) \quad (2)$$

When the softclient detects that the data allowance is about to be reached (e.g., based on any of the criteria (a)-(d) mentioned above), the softclient application may switch from VoIP mode to callback mode. In some embodiments, the softclient application may first provide a warning before switching modes, e.g., either a warning that the user is approaching one or more of criteria (a)-(d), or that the user has just reached one or more of criteria (a)-(d) and that the mode is about to change.

In callback mode, the softclient may enable its callback controller logic to terminate a voice path at the cellular number while allowing access to full enterprise features for the calls. Full enterprise features may include a set of PBX features that a user is normally able to access when the user is using his or her softphone within the enterprise. For example, a user may have an IP telephone on their desk that is configured to access a set of call features provisioned at the enterprise communication system. These call features are full enterprise features that will be available to the softphone running on a mobile phone. Examples of full enterprise features may include "Send All Calls (call coverage)", call forwarding, bridging using bridged line appearances, call pickup, call park or unpark, group pickup, conference calls, and so forth.

When a user is in callback mode, the softclient may still use the data network, but essentially only for low-date usages such as SIP session setup signaling and feature invocation messages. The bandwidth and amount of data consumed by low-date usages is negligible when compared with the bandwidth consumed by VoIP or video/IP modes.

Embodiments in accordance with the present disclosure provide effective and efficient management of bandwidth consumption by a softclient application, based upon automatically-queried usage information and/or end user-provided billing cycle and usage limits. Compared to extending the call to cellular number using EC 500 type of operation, embodiments provide continued availability of enterprise features to the end user regardless of whether the softclient is using callback mode or VoIP mode of operation.

Embodiments provide an ability for a softclient to accept data network usage allowances and/or limits as an input datum, and use this datum to manage usage by the softclient of its mobile data plan by providing a cost effective selection and usage of either a callback mode of operation or a VoIP mode of operation.

Figure 4:
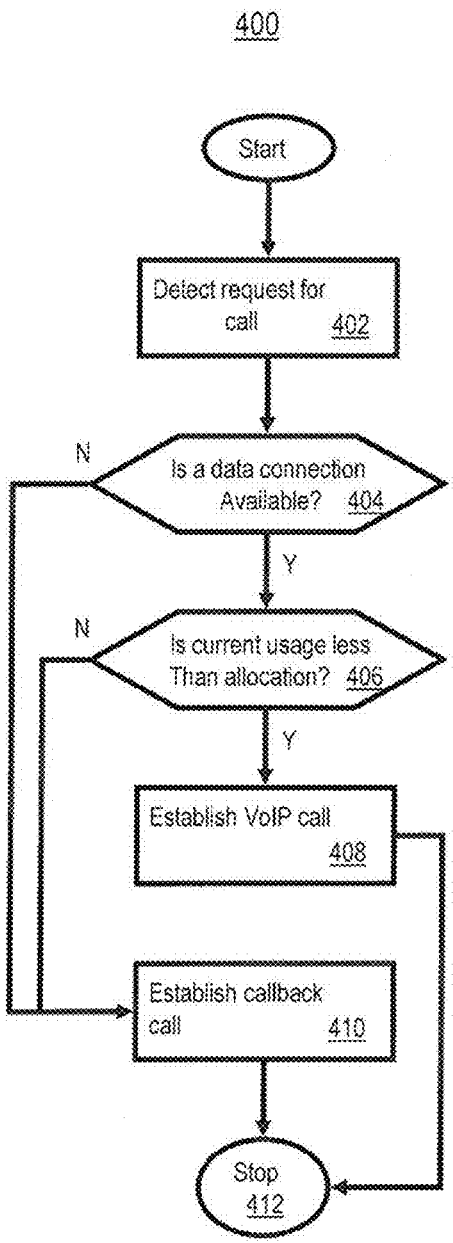
FIG. 4 illustrates a process in accordance with an embodiment of the present disclosure.

FIG. 4 illustrates a process 400 in accordance with an embodiment of the present disclosure. Process 200 begins at step 402, at which an embodiments in accordance with the present disclosure, such as a softclient running on a mobile phone, detects a request for a call. The request for a call may represent either an outgoing call that may be initiated in either VoIP mode or callback mode, or may represent an incoming call that may be terminated in either VoIP mode or callback mode.

Next, control of process 400 transitions to step 404 at which a check is made regarding whether a data connection is available. The data connection would be one that is suitable to support wireless VoIP communications. An example of situations in which a suitable data connection might not be available may include if the mobile phone is not within a data coverage area, or if the data connection does not have sufficient bandwidth or QoS, or if the mobile user does not possess sufficient privilege or authorization to access a detected data connection, and so forth. If the outcome of step 404 is affirmative, then control of process 400 transitions to step 406. If the outcome of step 404 is negative, then control of process 400 transitions to step 410.

At step 406, a check is made whether the user's current data plan usage of the data connection is less than the user's allocation. This may involve determining a cumulative amount of data sent using the data connection during the current billing period. For example, the allocation may be determined by one or more of criteria (a)-(d) discussed above. If the outcome of step 406 is affirmative, then control of process 400 transitions to step 408. If the outcome of step 406 is negative, then control of process 400 transitions to step 410.

At step 408, process 400 has determined that a data connection is available and that the user's current data plan usage of the data connection is less than the user's allocation. Therefore, embodiments will favor a VoIP connection by setting up a VoIP call at step 408. Control of process 400 then transitions to step 412 at which process 400 stops.

At step 410, process 400 has determined that either a data connection is not available, and/or that the user's current data plan usage of the data connection is more than the user's allocation. Therefore, a VoIP connection is not available and embodiments will set up a callback call at step 410. In particular, a callback call may be established by setting the voice path up through the cellular voice network rather than a VoIP media stream path through the data network. Control of process 400 then transitions to step 412 at which process 400 stops.

Figure 5:
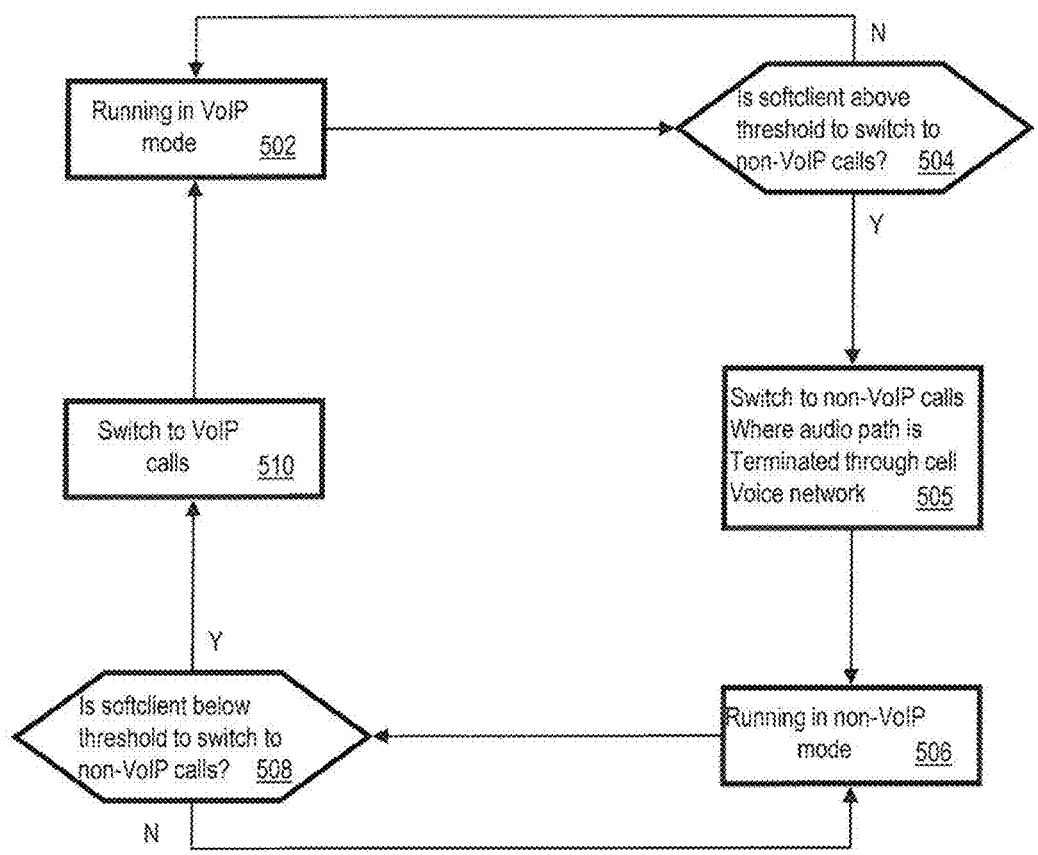
FIG. 5 is a process according to an embodiment of the present disclosure.

FIG. 5 illustrates a process 500 to select between VoIP call setup versus non-VoIP call setup. For example, process 500 may initially be in state 502, i.e., a mobile phone has a softclient that is running in VoIP mode. Periodically, process 500 may transition from state 502 to decision step 504, at which a check is made whether a threshold condition to switch to non-VoIP calls has been reached. Examples of threshold conditions have been described above, e.g., criteria (a)-(d). If the result of decision step 504 is negative, then control of process 500 reverts to step 502.

If the result of decision step 504 is positive, then control of process 500 transitions to state 505, at which the softclient switches from making VoIP calls to making non-VoIP calls in which an audio media path is terminated through the cellular voice network. In some embodiments an ongoing call may be affected, and in other embodiments the switch may affect only future calls. Process 500 then transitions to state 506.

At state 506, the softclient in the mobile phone is running in non-VoIP mode. Periodically, process 500 may transition from state 506 to decision step 508, at which a check is made whether the softclient in the mobile phone is operating at a threshold condition below that which is necessary to switch to non-VoIP mode. If the result of decision step 508 is negative, then control of process 500 reverts to step 506. If the result of decision step 508 is positive, then control of process 500 transitions to step 510.

At step 510, the softclient switches from making non-VoIP calls to making VoIP calls in which the audio media path is no longer terminated through the cellular voice network. In some embodiments an ongoing call may be affected, and in other embodiments the switch may affect only future calls. Process 500 then transitions to state 502, at which process 500 may repeat.

Figure 6:
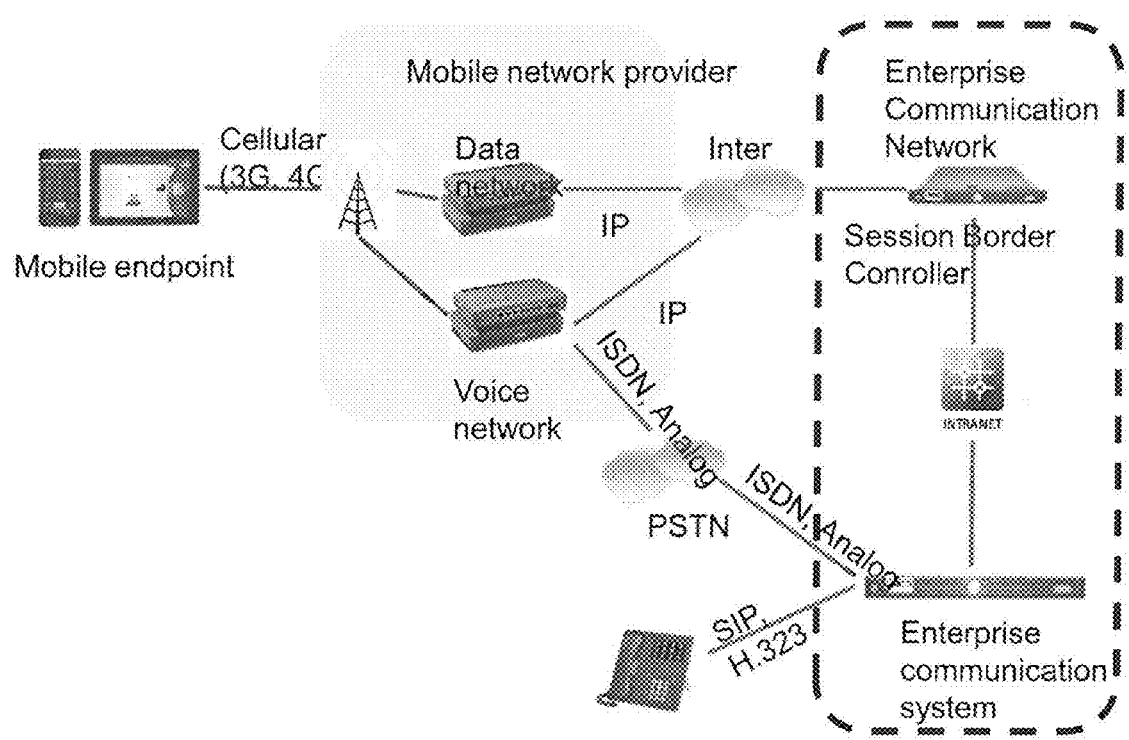
FIG. 6 illustrates an embodiment of a system in accordance with an embodiment of the present disclosure.

FIG. 6 illustrates an embodiment of a system 600 in accordance with an embodiment of the present disclosure. System 600 is illustrated in an initial state, in reference to FIGS. 7-9.

Figure 7:
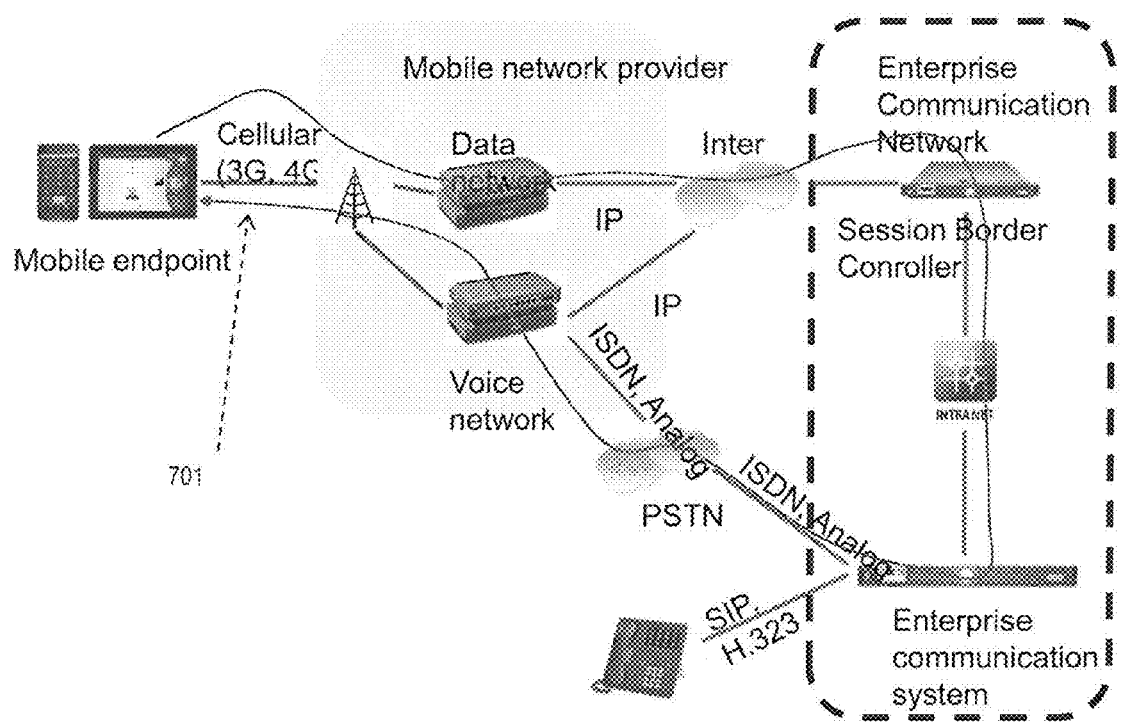
FIG. 7 illustrates an embodiment of a system in accordance with an embodiment of the present disclosure.

FIG. 7 illustrates an embodiment of a system 700 in accordance with an embodiment of the present disclosure, in which a first step of telecommuter call setup is being performed. A softphone that is running on the mobile phone may set up a call towards the mobile phone's number using path 701. The call originates from softphone, and travels to the enterprise communication network shown on the right. The call is then routed by the enterprise communication system out towards the mobile network, and then to the mobile phone.

Figure 8:
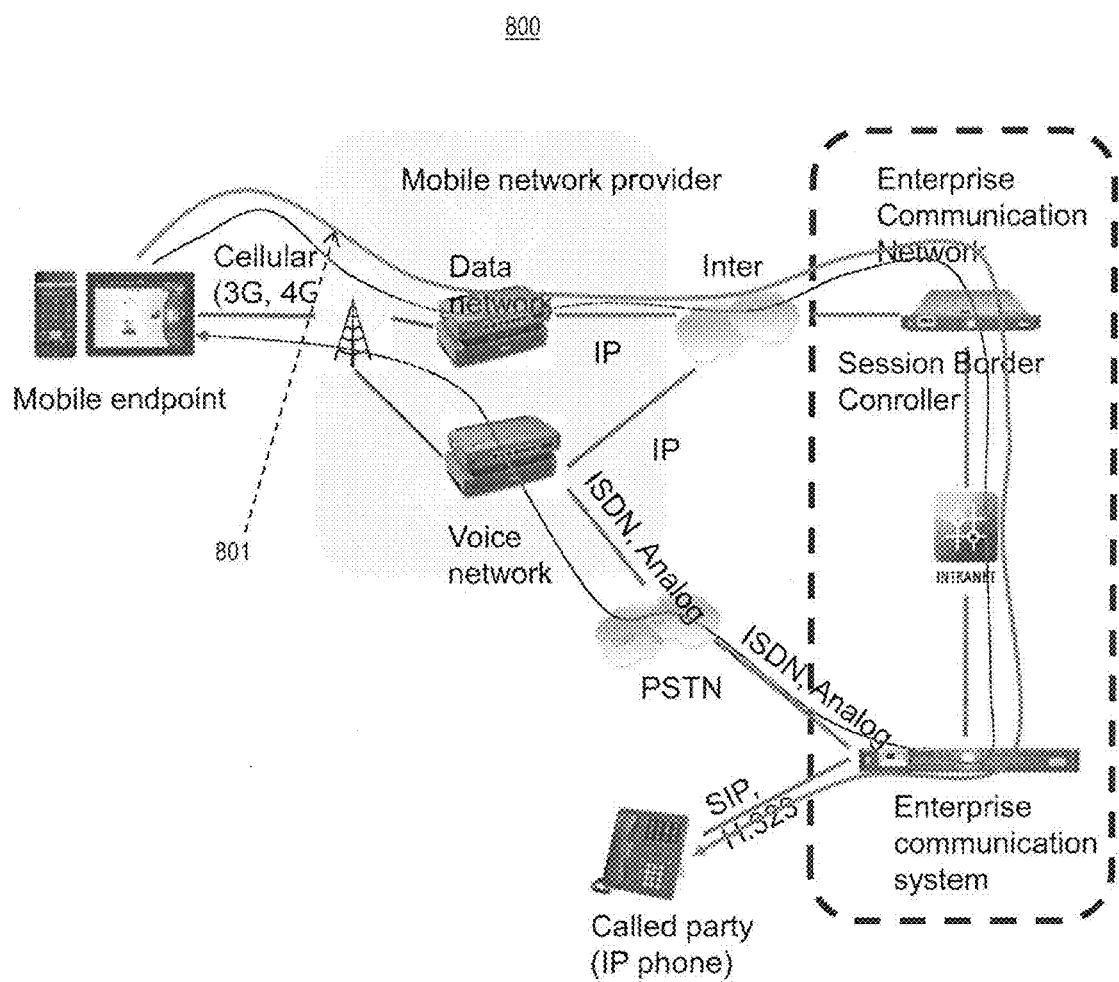
FIG. 8 illustrates an embodiment of a system in accordance with an embodiment of the present disclosure.

FIG. 8 illustrates an embodiment of a system 800 in accordance with an embodiment of the present disclosure, in which a second step of telecommuter call setup is being performed. In particular, in reference to path 801 indicated in FIG. 8, softphone running on the mobile phone sets up a second call towards the called party. In this example, the called party is illustrated as an IP phone within the enterprise, but embodiments are not limited in this regard. The called party may use other types of phones, or may ne located outside the enterprise domain. For example, the called party may be a non-IP phone inside the enterprise network, or an external PSTN number. Once the two calls are established as illustrated, the signaling done during this second call setup ensures that the media path between the mobile and the called party is established.

Figure 9:
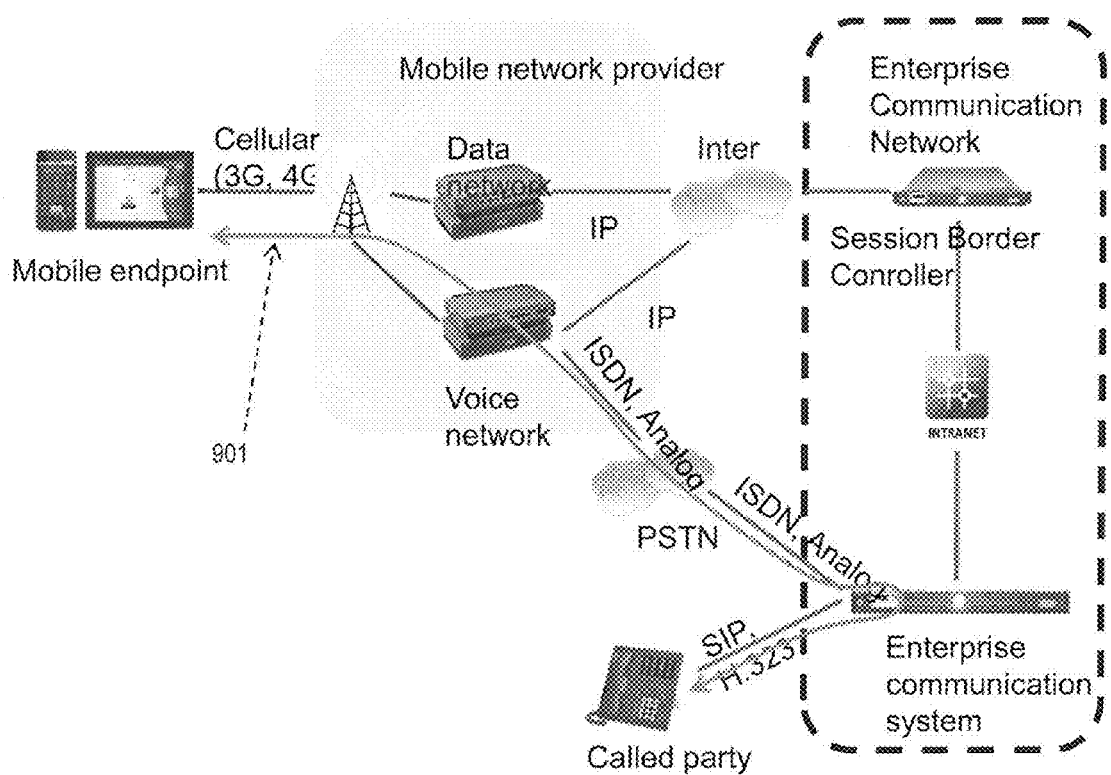
FIG. 9 illustrates an embodiment of a system in accordance with an embodiment of the present disclosure.

FIG. 9 illustrates an embodiment of a system 900 in accordance with an embodiment of the present disclosure, in which the media path is established. In particular, in reference to path 901 indicated in FIG. 9, in a telecommuter call the media path between the mobile phone's cellular number and the called party is established. In system 900, media path 901 travels from the cellular network to PSTN, and then to the enterprise communication system. The enterprise communication system converts the PSTN media to VoIP and then exchanges VoIP packets with the called party (if the called is an IP endpoint). Bi-directional media traffic is shown between the mobile endpoint and the called party.

The order in which portions of the method are performed is not intended to be construed as limitation, and further any number of the method steps may be combined in order to implement the method or an alternative method without departing from the scope of the present invention. A person skilled in the art will appreciate that embodiments of the method of the present invention may not be limited to the description of process 100. Further, various embodiments and steps may be implemented within the scope of the present invention. For example, information corresponding to various data plan limits and current usage by the user may be stored in and retrieved from a database.

Figure 10:
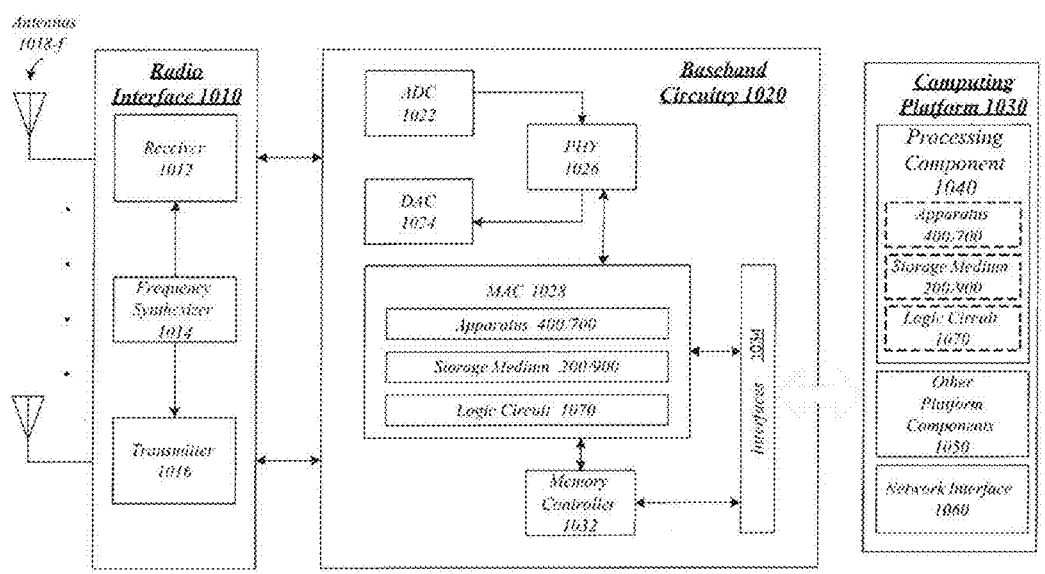
FIG. 10 is a block diagram of a mobile device, according to an embodiment of the present disclosure.

FIG. 10 illustrates an embodiment of a device 1000. In some examples, device 1000 may be configured or arranged for wireless communications in a wireless network. Device 1000 may implement, for example, a logic circuit 1070 and/or a mobile phone that incorporates or carries out embodiments in accordance with the present disclosure. The logic circuit 1070 may include physical circuits to perform operations described for other apparatus. As shown in FIG. 10, device 1000 may include a radio interface 1010, baseband circuitry 1020, and computing platform 1030, although examples are not limited to this configuration.

The device 1000 may implement some or all of the structure and/or operations for apparatus, storage medium 600/900 and/or logic circuit 1070 in a single computing entity, such as entirely within a single device. The embodiments are not limited in this context.

Radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for other apparatus, a storage medium, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits (e.g., processor circuit 1020), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11 such as IEEE 802.11ad.

Device 1000 may be, for example, user equipment, a computer, a personal computer (PC), a desktop computer, a laptop computer, a notebook computer, a netbook computer, a tablet computer, other small computing devices, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or for wireless docking, although the examples are not limited in this respect.

Embodiments of device 1000 may be implemented using single input single output (SISO) antenna architectures. However, certain implementations may include multiple antennas (e.g., antennas 1018-*f*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

The exemplary systems and methods of this present invention have been described in relation to a mobile phone. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention may be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method to select an operating mode of a mobile device, the method comprising:
   detecting a request for a call;
   determining by a processor of the mobile device a data usage limit;
   determining by a processor of the mobile device a cumulative amount of data sent using the data connection during a current billing period;
   determining, by a processor of the mobile device, an availability of a data connection;
   setting a communication mode of the mobile device depending upon the availability of the data connection and a comparison of the cumulative amount of data sent to the data usage limit;
   establishing a first call leg between the mobile device and a system controller, wherein the first call leg is by use of the set communication mode;
   establishing a second call leg between the system controller and a far-end terminal; and
   joining, by the system controller, the first call leg and the second call leg to produce the call.

2. The method of claim 1, further comprising:
   during an ongoing call, determining by the processor of the mobile device a cumulative amount of data sent using the data connection during the current billing period;
   determining, by a processor of the mobile device, an availability of the data connection; and
   changing the communication mode of the ongoing call depending upon the availability of the data connection and a present comparison of the cumulative amount of data sent to the data usage limit.

3. The method of claim 1, wherein setting the communication mode further comprises setting the communication mode to VoIP mode if the cumulative amount of data sent is less than the data usage limit.

4. The method of claim 1, wherein setting the communication mode further comprises setting the communication mode to callback mode if the cumulative amount of data sent is greater than the data usage limit.

5. The method of claim 1, wherein the data usage limit comprises a fixed limit per billing period.

6. The method of claim 1, wherein the data usage limit comprises a time-dependent limit.

7. The method of claim 1, wherein the data usage limit comprises a sliding time-dependent limit.

8. The method of claim 1, wherein the data usage limit comprises a limit that is specific to an identification of the data connection.

9. The method of claim 1, wherein the data usage limit comprises a limit that is specific to a billing cycle of the data connection.

10. The method of claim 1, further comprising providing a warning if the cumulative amount of data sent is within a predetermined threshold from the data usage limit.

11. A system to select an operating mode of a mobile device, the system comprising:
an interface configured to detect a request for a call;
a processor of the mobile device configured:
to detect a data usage limit;
to determine a cumulative amount of data sent using the data connection during a current billing period;
to determine an availability of a data connection;
to set a communication mode of the mobile device depending upon the availability of the data connection and a comparison of the cumulative amount of data sent to the data usage limit;
establishing a first call leg between the mobile device and a system controller, wherein the first call leg is by use of the set communication mode;
establishing a second call leg between the system controller and a far-end terminal; and
joining, by the system controller, the first call leg and the second call leg to produce the call.

12. The system of claim 11, further comprising:
during an ongoing call, determining by the processor of the mobile device a cumulative amount of data sent using the data connection during the current billing period;
determining, by a processor of the mobile device, an availability of the data connection; and
changing the communication mode of the ongoing call depending upon the availability of the data connection and a present comparison of the cumulative amount of data sent to the data usage limit.

13. The system of claim 11, wherein setting the communication mode further comprises setting the communication mode to VoIP mode if the cumulative amount of data sent is less than the data usage limit.

14. The system of claim 11, wherein setting the communication mode further comprises setting the communication mode to callback mode if the cumulative amount of data sent is greater than the data usage limit.

15. The system of claim 11, wherein the data usage limit comprises a fixed limit per billing period.

16. The system of claim 11, wherein the data usage limit comprises a time-dependent limit.

17. The system of claim 11, wherein the data usage limit comprises a sliding time-dependent limit.

18. The system of claim 11, wherein the data usage limit comprises a limit that is specific to an identification of the data connection.

* * * * *